United States Patent [19]

Kuroda et al.

[11] Patent Number: 5,471,869
[45] Date of Patent: Dec. 5, 1995

[54] COMBUSTION STATE-DETECTING SYSTEM FOR INTERNAL COMBUSTION ENGINES

[75] Inventors: Shigetaka Kuroda; Toshihiko Sato; Tsuyoshi Takizawa, all of Wako, Japan

[73] Assignee: Honda Giken Kogyo Kabushiki Kaisha, Tokyo, Japan

[21] Appl. No.: 303,683

[22] Filed: Sep. 9, 1994

[30] Foreign Application Priority Data

Sep. 10, 1993 [JP] Japan .................................. 5-249931

[51] Int. Cl.⁶ ................................................ G01M 15/00
[52] U.S. Cl. ................................. 73/117.3; 73/116
[58] Field of Search ............................ 73/117.3, 115, 73/116

[56] References Cited

U.S. PATENT DOCUMENTS

| | | | |
|---|---|---|---|
| 4,802,454 | 2/1989 | Tanaka | 73/115 |
| 4,887,574 | 12/1989 | Kuroiwa et al. | 73/116 |
| 5,343,844 | 9/1994 | Fukui et al. | 73/116 |
| 5,390,537 | 2/1995 | Kuroda et al. | 73/117.3 |

FOREIGN PATENT DOCUMENTS

| | | |
|---|---|---|
| 3-286166 | 12/1991 | Japan . |
| 6-101560 | 4/1994 | Japan . |

*Primary Examiner*—Richard Chilcot
*Assistant Examiner*—Max H. Noori
*Attorney, Agent, or Firm*—Nikaido, Marmelstein, Murray & Oram

[57] ABSTRACT

A combustion state-detecting system for an internal combustion engine is provided, which detects misfires occurring in the engine. A crank angle sensor generates a crank angle signal with a predetermined period shorter than a firing period of the engine whenever the crankshaft rotates through a predetermined angle. An ECU detects the rotational speed of the engine, based on the crank angle signal whenever the crank angle signal is generated to generate a rotational speed signal, and filters the rotational speed signal to extract a specific frequency component therefrom. A rate of variation in the extracted specific frequency component is calculated every first predetermined time period, and an average value of the rate of variation is calculated every second predetermined time period longer than the first predetermined time period. Further, the difference between the average value and the rate of variation is calculated, and absolute values of the difference is cumulated over the second predetermined time period to obtain a difference cumulative value. Then, the difference cumulative value is compared with a predetermined value, and it is determined that the engine is in a continuous degraded combustion state when the difference cumulative value has continued to exceed the predetermined value, and that the engine is in a sporadic degraded combustion state when the difference cumulative value once exceeds the predetermined value once and then becomes smaller than the predetermined value, before it again exceeds the predetermined value.

3 Claims, 9 Drawing Sheets

COMBUSTION STATE-DETECTING SYSTEM FOR INTERNAL COMBUSTION ENGINES

BACKGROUND OF THE INVENTION

1. Field of the Invention

This invention relates to a combustion state-detecting system for internal combustion engines, and more particularly to a combustion state-detecting system which detects a state of combustion (misfiring) in the engine, based on a variation in the angular velocity of the crankshaft during rotation of the engine in every combustion cycle.

2. Prior Art

To detect a cylinder of an internal combustion engine in which normal firing does not take place due to failure in the ignition system, the fuel supply system or the like of the engine, an abnormality-detecting system is conventionally known, for example, by Japanese Provisional Patent Publication (Kokai) No. 3-286166, which detects a rate of variation in the angular velocity of the crankshaft during rotation of the engine in every combustion cycle, to thereby determine whether or not an abnormality has occurred in any of the cylinders, based on the detected rate of variation.

In the above conventional abnormality-detecting system, however, when a single or sporadic misfire has occurred in a particular cylinder, the engine undergoes so-called reactionary vibrations following the sporadic misfire to cause fluctuations in the angular velocity of the crankshaft. As a result, it is erroneously detected that a plurality of misfires have occurred, though actually only a single misfire has occurred.

To avoid such an erroneous detection caused by reactionary vibrations following a sporadic misfire, the present assignee has already proposed a combustion state-detecting system by Japanese Provisional Patent Publication (Kokai) No. 6-101560 and U.S. Ser. No. 08/120,832 corresponding thereto, which analyzes patterns of variation in the rotational speed of the engine which can be obtained after misfires, and inhibits a determination from being rendered that a misfire has occurred if the engine rotational speed varies in accordance with a pattern of variation in the engine rotational speed specific to reactionary vibrations following a misfire.

According to this proposed system, a rate of variation in the rotational speed of the engine is measured over a predetermined time period, an average value thereof is calculated, and then the absolute value of the difference between the rate of variation and the average value thereof is calculated, followed by sequentially cumulating the absolute values every predetermined time period, to thereby obtain a difference cumulative value. If the difference cumulative value exceeds a predetermined value, it is determined that the combustion state of the engine is degraded. Further, a rate of variation in the rotational speed of the engine over one-past combustion cycle (corresponding to consecutive generation of four TDC signal pulses if the engine is a four-cylinder engine) from the time the degradation of the combustion state is determined is analyzed. When a minimal value (or a maximal value) exists in the rate of variation in the rotational speed over the one past combination cycle, it is determined that a cylinder where spark ignition took place two TDC signal pulses before the cylinder corresponding to the minimal or maximal value misfired. Furthermore, to avoid erroneous detection caused by reactionary vibrations, a minimal value (or maximal value) obtained at a present TDC signal pulse, which can lead to a determination that a misfire has occurred, is compared with another minimal value (or maximal value) obtained three TDC signal pulses before the present TDC signal pulse, and if the former is larger (or smaller) than the latter, it is determined that the cylinder corresponding to the present TDC signal pulse or the present minimal (or maximal) value has not misfired.

In the above proposed system, however, to avoid erroneous detection caused by reactionary vibrations, a comparison is made between a minimal or maximal value of the rate of variation in the rotational speed obtained at the present TDC signal pulse and one obtained three TDC signal pulses before the present TDC signal pulse. In other words, a comparison is made between minimal or maximal values of the rate of an engine speed variation occurring in a predetermined pattern. As a result, minimal or maximal values of the rate of engine speed variation occurring in patterns other than the above pattern can all lead to determinations that misfires have occurred. Specifically, when a particular cylinder (e.g. #1 cylinder) undergoes intermittent sporadic misfires, for example, when the present cylinder is determined to have misfired due to a failure to supply fuel to the cylinder, even if fuel is properly injected for the following cylinder, part of the injected fuel adheres to the inner wall of the intake pipe of the engine, whereby a less amount of fuel than the amount required for combustion is supplied to the above following cylinder. Consequently, the air-fuel ratio of a mixture supplied to the cylinder becomes so lean that sufficient engine torque cannot be obtained, resulting in further increased reactionary vibrations, which causes occurrence of a minimal or maximal value every combustion cycle (every four TDC signal pulses) in a pattern different from the above-mentioned three TDC signal pulse pattern. As a result, it can be determined that the engine has misfired, though actually it is in a normal combustion state.

Further, if to avoid erroneous detection caused by reactionary vibrations, a comparison is made, for example, between minimal or maximal values of the rate of variation in the rotational speed occurring within four TDC signal pulses, this is disadvantageous in the case where a particular cylinder continuously undergoes misfires (continuous misfiring), because a minimal or a maximal value of the rate of variation in the rotational speed occurs every four TDC signal pulses, and as a result, the engine can be erroneously, determined to be in a normal combustion state depending on the comparison result of the minimal or maximal values, though actually the engine is in a misfiring state.

Furthermore, in the case where minimal or maximal values of the engine speed variations caused by reactionary vibrations occur in patterns other than the four TDC signal pulse pattern, the above proposed system cannot perform determination of occurrence of misfires, based on such minimal or maximal values of the engine speed variation.

SUMMARY OF THE INVENTION

It is the object of the invention to provide a combustion state-detecting system for internal combustion engines, which is capable of accurately detecting a combustion state of cylinders of the engine without erroneous detection of misfires caused by reactionary vibrations of the engine attributed to a sporadic misfire or sporadic misfires occurring in the engine.

To attain the above object, the present invention provides a combustion state-detecting system for an internal combustion engine having at least one spark plug, and a crankshaft, comprising:

crank angle signal-generating means for generating a crank angle signal with a predetermined period shorter than a firing period of the engine whenever the crankshaft rotates through a predetermined angle;

engine rotational speed-detecting means for detecting a rotational speed of the engine, based on the crank angle signal whenever the crank angle signal is generated, and for generating a rotational speed signal indicative of the rotational speed detected by the engine rotational speed-detecting means;

filtering means for filtering the rotational speed signal to extract a specific frequency component therefrom;

variation rate-calculating means for calculating a rate of variation in the specific frequency component extracted by the filtering means every first predetermined time period;

average value-calculating means for calculating an average value of the rate of variation every second predetermined time period longer than the first predetermined time period;

difference cumulative value-calculating means for calculating a difference between the average value and the rate of variation, and for cumulating absolute values of the difference over the second predetermined time period to obtain a difference cumulative value; and combustion state-determining means for comparing the difference cumulative value with a predetermined value, and for determining that the engine is in a degraded combustion state when the difference cumulative value exceeds the predetermined value;

wherein the combustion state-determining means includes combustion state kind-determining means for determining that the engine is in a continuous degraded combustion state when the difference cumulative value has continued to exceed the predetermined value, and determines that the engine is in a sporadic degraded combustion state when the difference cumulative value once exceeds the predetermined value and then becomes smaller than the predetermined value, before the difference cumulative value again exceeds the predetermined value.

Preferably, the combustion state-determining means includes sign change-determining means for determining a change in sign of a value of the rate of variation by determining whether there has been a sign changing point at which a direction of change in the rate of variation is inverted from a direction in which the rate of variation decreases to a direction in which the rate of variation increases or vice versa, over the second predetermined time period before a time point the difference cumulative value is determined to exceed the predetermined value, the combustion state kind-determining means determining that the engine has undergone a sporadic misfire when a value of the rate of change at a present one of the sign changing point is smaller than a value of the rate of change at an immediately preceding one of the sign changing point.

In a preferred embodiment of the invention, the second predetermined time period corresponds to one combustion cycle of the engine.

The above and other objects, features, and advantages of the invention will be more apparent from the following detailed description taken in conjunction with the accompanying drawings.

DETAILED DESCRIPTION

The invention will now be described in detail with reference to the drawings showing an embodiment thereof.

Figure 1:
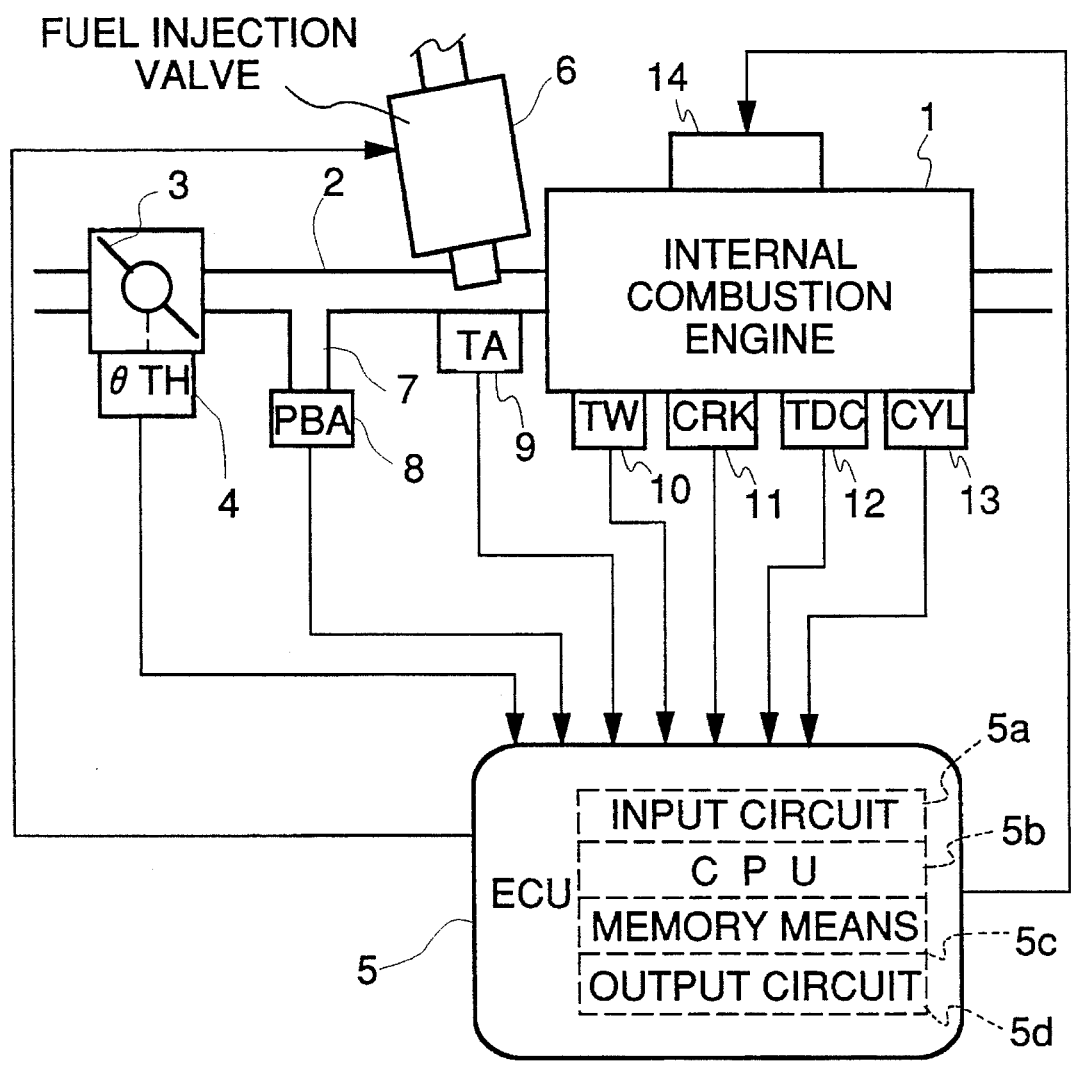
FIG. 1 is a block diagram schematically showing the whole arrangement of an internal combustion engine and a combustion state-detecting system therefor, according to an embodiment of the invention.

Referring first to FIG. 1, there is shown the whole arrangement of an internal combustion engine and a combustion state-determining system therefor, according to an embodiment of the invention. In an intake pipe 2 of the engine 1, there is arranged a throttle valve 3, to which is connected a throttle valve opening (θTH) sensor 4 for generating an electric signal indicative of the sensed throttle valve opening and supplying the same to an electronic control unit (hereinafter referred to as "the ECU")5.

Fuel injection valves 6 are provided, respectively, for cylinders of the engine 1 and each arranged in the intake pipe 2 at a location between the engine 1 and the throttle valve 3 and slightly upstream of an intake valve, not shown. The fuel injection valves 6 are connected to a fuel pump, not shown, and electrically connected to the ECU 5 to have their valve opening periods controlled by signals therefrom.

On the other hand, an intake pipe absolute pressure (PBA) sensor 8 is provided in communication with the interior of the intake pipe 2 via a conduit 7 at a location immediately downstream of the throttle valve 3, for supplying an electric signal indicative of the sensed absolute pressure PBA to the ECU 5. An intake air temperature (TA) sensor 9 is inserted into the intake pipe 2 at a location downstream of the intake pipe absolute pressure sensor 8, for supplying an electric signal indicative of the sensed intake air temperature TA to the ECU 5.

An engine coolant temperature (TW) sensor 10, which may be formed of a thermistor or the like, is mounted in the cylinder block of the engine 1 for supplying an electric signal indicative of the sensed engine coolant temperature TW to the ECU 5.

A cylinder-discriminating sensor (hereinafter referred to as "the CYL sensor") 13, a top dead center (TDC) sensor 12, and a crank angle (CRK) sensor 11 are arranged in facing relation to a camshaft or a crankshaft of the engine 1, neither of which is shown. The CYL sensor 13 generates a signal pulse (hereinafter referred to as "CYL signal pulse") at a predetermined crank angle of a particular cylinder of the engine 1. The TDC sensor 12 generates a TDC signal pulse at a predetermined crank angle before a top dead point (TDC) of each cylinder corresponding to the start of the intake stroke of the cylinder (e.g. whenever the crankshaft rotates through 180 degrees in the case where the engine is of the 4-cylinder type). The CRK sensor 11 generates crank angle pulses (hereinafter referred to as "CRK signal pulses") at predetermined crank angles with a repetition period shorter than the repetition period of TDC signal pulses (e.g. whenever the crankshaft rotates through 30 degrees). The CYL signal pulses, TDC signal pulses, and CRK signal pulses are supplied to the ECU 5.

Arranged in each cylinder of the engine 1 is a spark plug 14, which is electrically connected to the ECU 5.

The ECU 5 is comprised of an input circuit 5a having the function of shaping the waveforms of input signals from various sensors mentioned above, shifting the voltage levels of sensor output signals to a predetermined level, converting analog signals from analog-output sensors to digital signals, and so forth, a central processing unit (hereinafter referred to as "the CPU") 5b, memory means 5c storing various operational programs which are executed by the CPU 5b and for storing results of calculations therefrom, etc., and an output circuit 5d which outputs driving signals to the fuel injection valves 6.

The CPU 5b operates in response to the abovementioned various engine parameter signals from the various sensors to determine operating conditions in which the engine 1 is operating, and calculates, based upon the determined engine operating conditions, a fuel injection period for each of the fuel injection valves 6 in synchronism with generation of TDC signal pulses, and ignition timing for each spark plug 14, to supply signals for driving the fuel injection valves 6 and the spark plugs 14 from the output circuit 5d.

Figure 2:
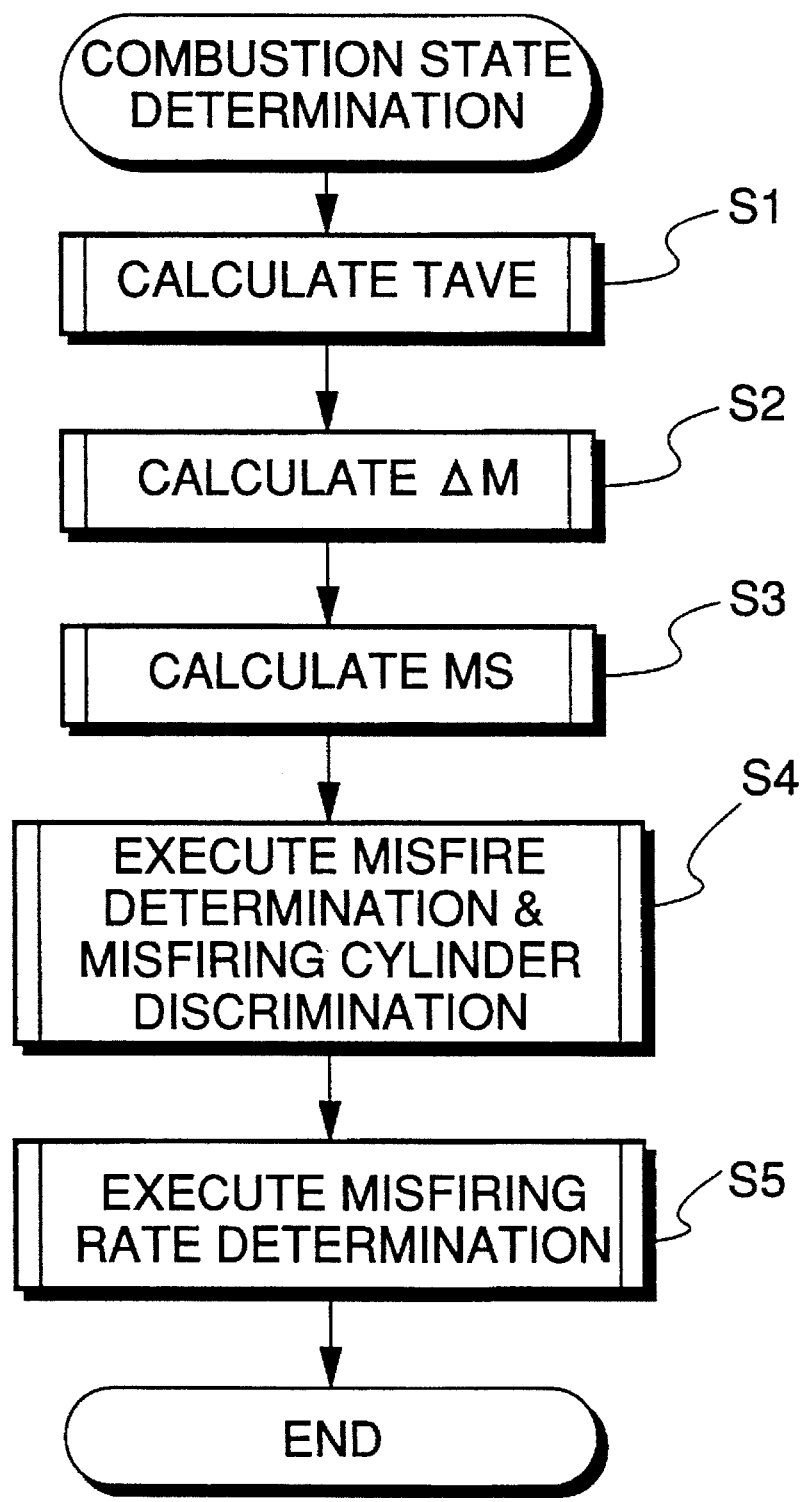
FIG. 2 is a flowchart showing a program (main routine) for determining a state of combustion of the engine.

FIG. 2 shows a main routine for determining a state of combustion of the engine 1.

First, at a step S1 in the figure, an average value TAVE (hereinafter referred to as "the first average value") of time intervals of occurrence of CRK signal pulses is calculated. The time intervals are proportional to the reciprocal of the engine rotational speed. At a step S2, a rate of variation $\Delta M$ in an average value M (hereinafter referred to as "the second average value") of values of the first average value TAVE is calculated. Then, a cumulative value MS of absolute values of the difference between the rate of variation $\Delta M$ and an average value thereof is calculated, at a step S3, and it is determined at a step S4 whether or not a misfire has occurred in the engine 1, based on the thus calculated rate of variation $\Delta M$, and the difference cumulative value MS. Then, at a step S5, a misfiring rate is calculated based on the misfiring state determined at the step S4, to determine combustion states of the engine.

Figure 3:
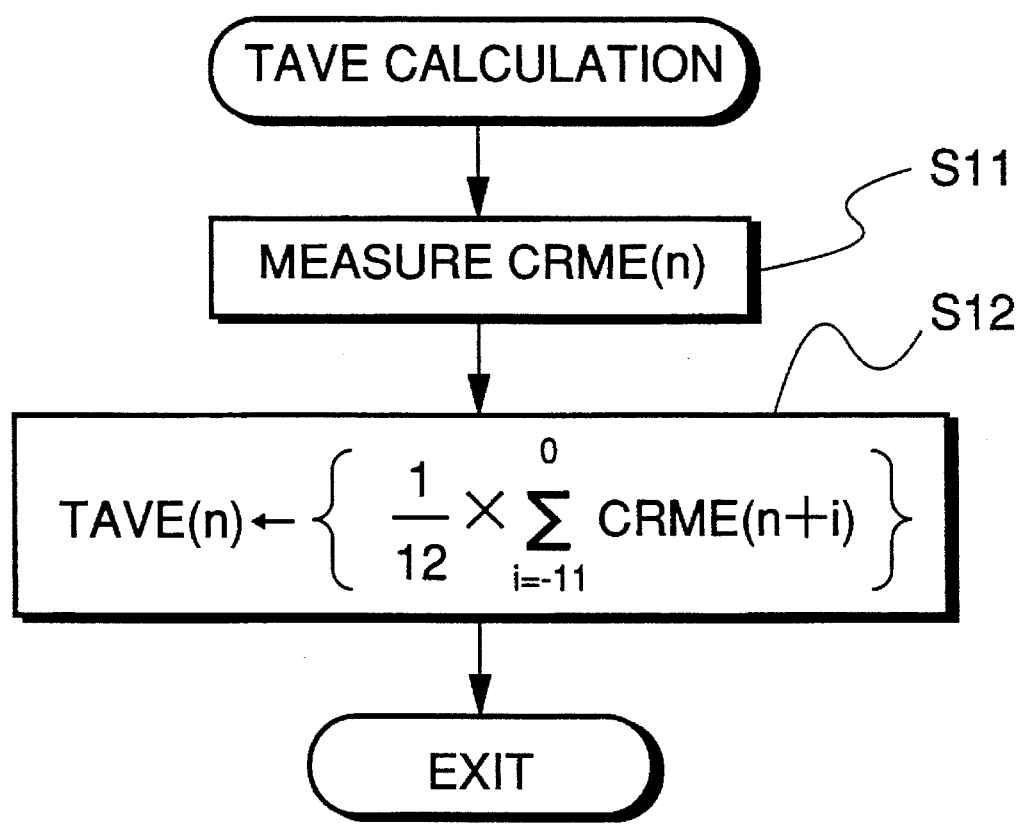
FIG. 3 is a flowchart showing a subroutine for calculating a first average value TAVE, which is executed during execution of the FIG. 2 program.

FIG. 3 shows a subroutine for calculating the first average value TAVE, which is executed at the step S1 of FIG. 2 in synchronism with generation of CRK signal pulses.

Figure 4:
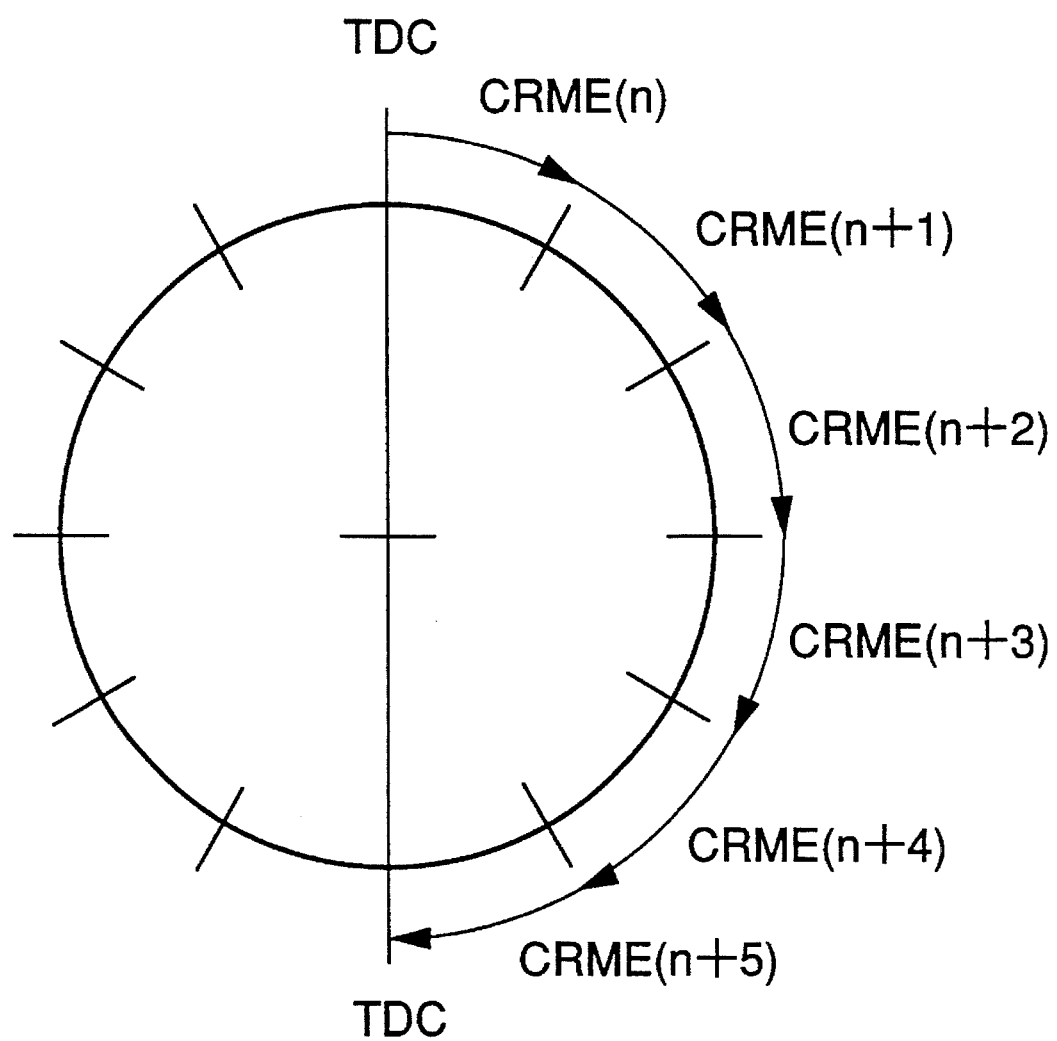
FIG. 4 is a diagram showing the relationship between measurement of a parameter CRME representative of the engine rotational speed and the rotational angle of the crankshaft.

At a step S11, time intervals CRME(n) of occurrence of CRK signal pulses are calculated. More specifically, time interval values of CRME(n), CRME(n+1), CRME(n+2) . . . are successively measured whenever the crankshaft rotates through 30 degrees, as shown in FIG. 4.

At a step S12, a first average value TAVE(n) is calculated, which is an average value of 12 CRME values from a value CRME(n–11) measured eleven loops before the present loop to a value CRME(n) in the present loop, by the use of the following equation (1):

$$TAVE(n) = 1/12 \times \sum_{i=-11}^{0} CRME(n+i) \tag{1}$$

In the present embodiment, since CRK signal pulses are each generated whenever the crankshaft rotates through 30 degrees, the first average value TAVE(n) is obtained over one rotation of the crankshaft. The first average value TAVE(n) obtained by thus averaging CRME values every period of one rotation of the crankshaft is free of the influence of primary vibration components in engine rotation over a period of one rotation of the crankshaft, i.e. noise components due to dimensional errors (such as manufacturing tolerances and mounting tolerances) of a pulser or a pickup forming the crank angle sensor 11.

The engine rotational speed NE is also calculated based on the TAVE(n) value.

Figure 5:
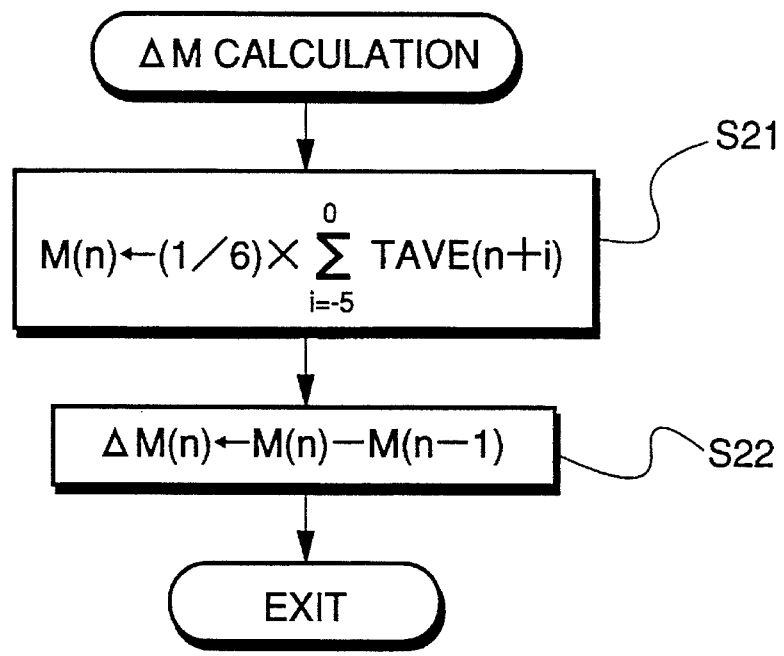
FIG. 5 is a flowchart showing a subroutine for calculating a parameter ΔM representative of a rate of variation in the engine rotational speed, which is executed during execution of the FIG. 2 program.

FIG. 5 shows a subroutine for calculating the rate of variation $\Delta M$, which is executed at the step S2 of FIG. 2 in synchronism with generation with TDC signal pulses.

At a step S21, a second average value M(n) is calculated by averaging six TAVE values from a value TAVE(n–5) obtained five loops before the present loop to a value TAVE(n) in the present loop, by the use of the following equation (2):

$$M(n) = 1/6 \times \sum_{i=-5}^{0} TAVE(n+i) \tag{2}$$

In the present embodiment, the engine 1 is a 4-cylinder/4-cycle engine, wherein spark ignition is carried out at any one of the cylinders (#1 cylinder to #4 cylinder) whenever the crankshaft rotates through 180 degrees. Therefore, the second average value M(n) is obtained from the first average value TAVE(n) over one firing period. The second average value M(n) obtained by such averaging (filtering) per ignition cycle contains only a specific frequency component of the rotational speed, which is therefore free of secondary vibration components representing a variation in torque of the engine due to combustion, i.e. vibration components in engine rotation over a period of a half rotation of the crankshaft.

At the following step S22, a rate of variation $\Delta M(n)$ in the second average value M(n) is calculated by the use of the following equation (3):

$$\Delta M(n) = M(n) - M(n-1) \tag{3}$$

When a misfire has occurred in the engine 1, the M(n) value increases so that the $\Delta M(n)$ value increases accordingly.

Figure 6:
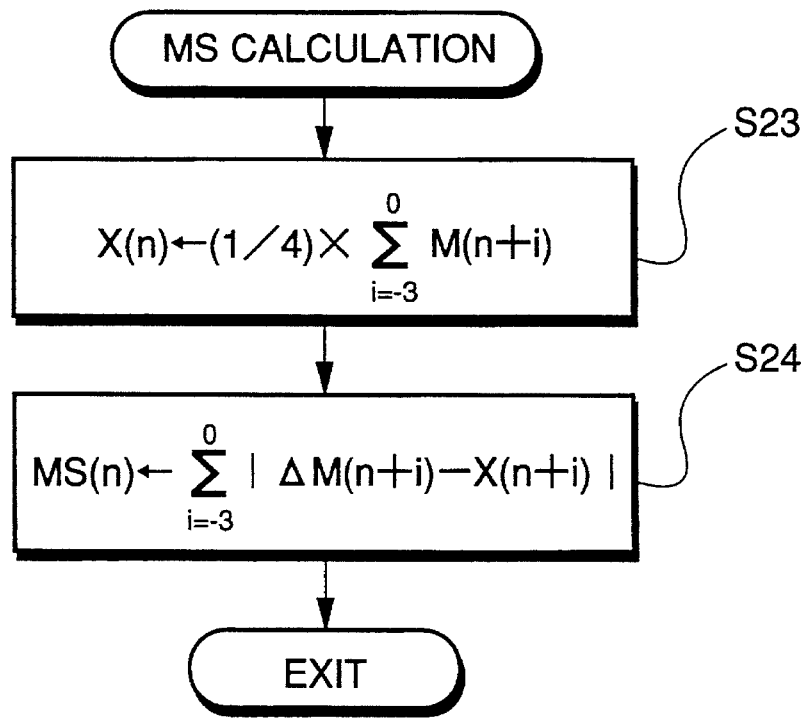
FIG. 6 is a flowchart showing a subroutine for calculating a difference cumulative value MS, which is executed during execution of the FIG. 2 program.

FIG. 6 shows a subroutine for calculating the difference cumulative value MS, which is executed at the step S3 of the FIG. 2 main routine in synchronism with generation of TDC signal pulses.

At a step S23, a variation rate average value X(n) is calculated by averaging four $\Delta M$ values from a value ΔM(n−3) calculated three loops before the present loop to a value ΔM(n) calculated in the present loop, by the use of the following equation (4):

$$X(n) = 1/4 \times \sum_{i=-3}^{0} \Delta M(n+i) \quad (4)$$

At the following step S24, the difference cumulative value MS(n) of the absolute values of the difference between the X(n) value calculated above and the ΔM(n) value is calculated by the use of the following equation (5):

$$MS(n) = \sum_{i=-3}^{0} |\Delta M(n+i) - X(n+i)| \quad (5)$$

By the above equation (5), a cumulation is made of absolute values of the difference between the rate of variation ΔM(n) and the average value X(n) thereof from a value a |ΔM(n−3)−X(n−3)| calculated three loops before the present loop to a value |ΔM(n)−X(n)| calculated in the present loop.

The difference cumulative value MS thus calculated assumes a large value when the ΔM value suddenly and largely increases.

Figure 7:
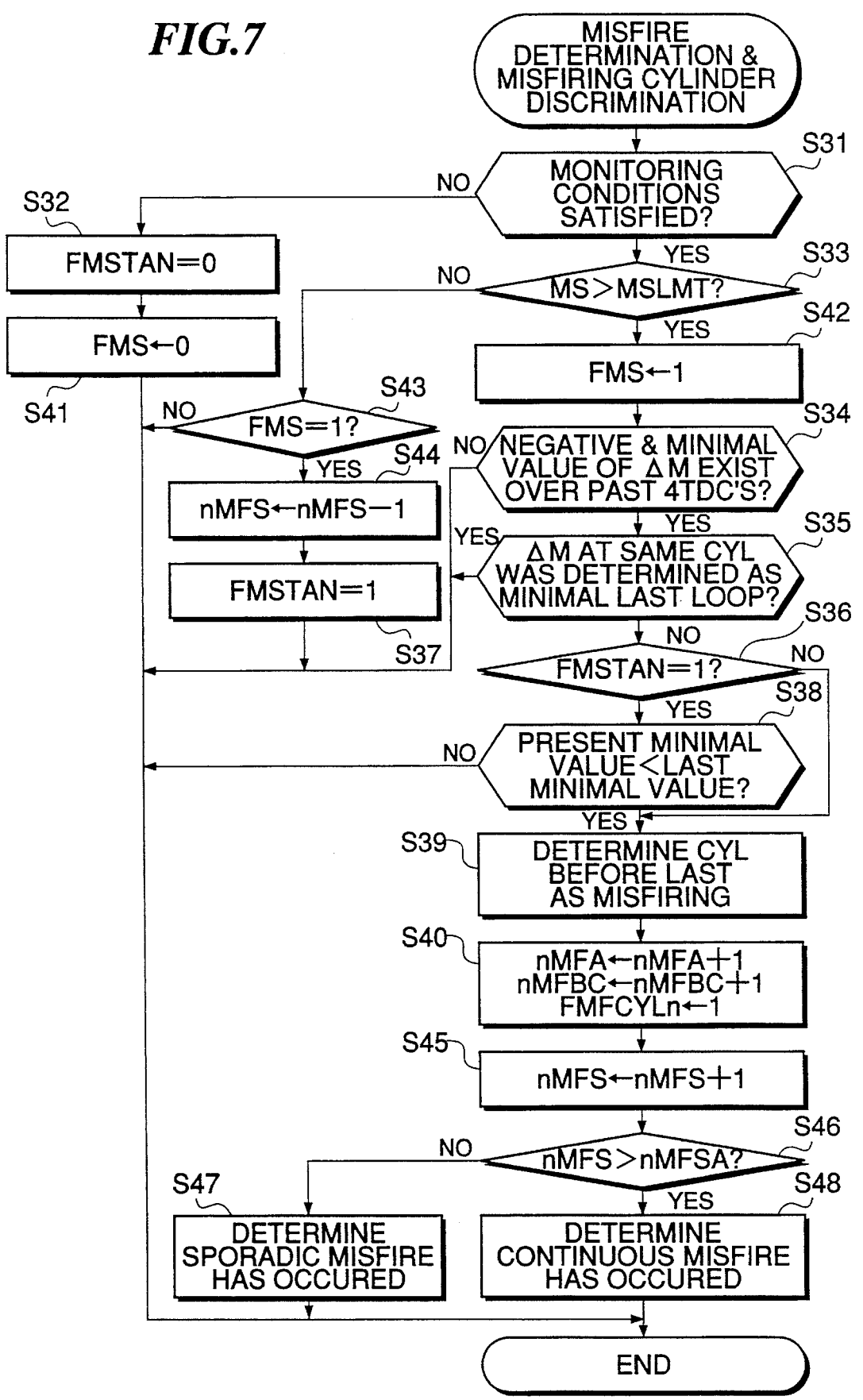
FIG. 7 is a flowchart showing a subroutine for carrying out a misfire determination and a misfiring cylinder discrimination, which are executed during execution of the FIG. 2 program.

FIGS. 7 shows a subroutine for carrying out a misfire determination and a misfiring cylinder discrimination, which is executed at the step S4 of FIG. 2 in synchronism with generation of TDC signal pulses.

At a step S31, it is determined whether or not monitoring conditions are satisfied, i.e. misfire determination, etc. can be carried out. The monitoring conditions are satisfied, e.g. when the engine is in a steady operating condition, and at the same time the coolant temperature TW, the intake air temperature TE, the engine rotational speed NE, etc. all fall within respective predetermined ranges. Specifically, satisfaction of the monitoring conditions is determined by executing a routine for determining satisfaction of monitoring conditions, not shown.

Figure 8:
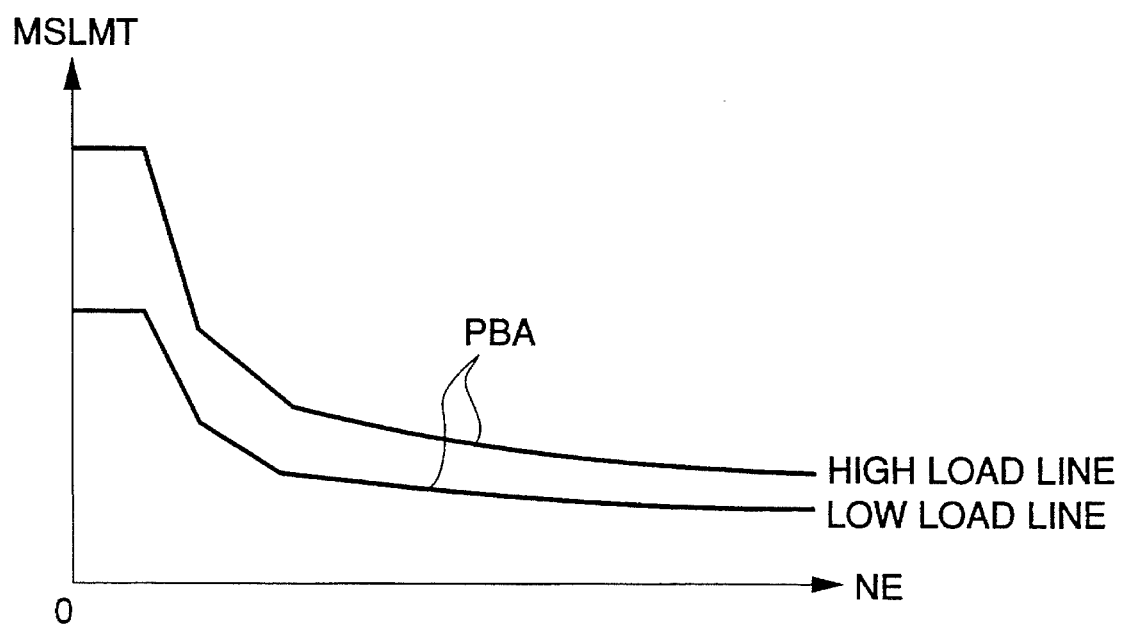
FIG. 8 is a diagram useful in explaining a method of setting a threshold value MSLMT for the misfire determination.

If the monitoring conditions are not satisfied, a sporadic misfire-determining flag FMSTAN, described hereinafter, for determining whether or not a sporadic misfire has occurred is reset to "0" at a step S32, and a misfire determining condition satisfaction flag FMS, which indicates whether or not a misfire determining condition determined at a step S33, hereinafter referred to, has been satisfied, is reset to "0" at a step S41, followed by terminating the present program. On the other hand, if the monitoring conditions are satisfied, it is determined at a step S33 whether or not the difference cumulative value MS is larger than a misfire-determining threshold value MSLMT. The misfire-determining threshold value MSLMT is read from an MSLMT map which is set according to the engine rotational speed NE and engine load (intake pipe absolute pressure PBA), as shown in FIG. 8. The threshold value MSLMT is set to a smaller value as the engine rotational speed NE increases, and set to a larger value as the engine load increases. The above setting reflects the fact that the combustion period becomes longer as the engine rotational speed is lower, resulting in larger engine speed variation components, and the output torque of the engine becomes larger as load on the engine is higher, resulting in larger torque variation components.

If the answer to the question at the step S33 is affirmative (YES), i.e. if MS>MSLMT is satisfied, it is determined that the combustion state is degraded, and the flag FMS is set to "1" at a step S42. Then, it is determined at a step S34 whether or not there has been ΔM value which assumes a negative and minimal value (<0) within a time period over which four TDC signal pulses have been generated (4 TDC's), i.e. over one combustion cycle of the engine, from the time a third preceding TDC signal pulse before the present loop was generated (3 TDC's before the present loop) to the time the present TDC signal pulse is generated. There is a fear that the timing for determining misfire occurrence may be delayed depending on the misfire determining threshold value MSLMT, so that no minimal value of the ΔM value can be detected within a time period over which three TDC signal pulses have been generated (3 TDC's) from the time a second preceding TDC signal pulse before the present TDC signal pulse was generated (2 TDC's before the present loop) to the time the present TDC signal pulse is generated. Therefore, detection of a minimal value of the ΔM value is executed over the time period of generation of four TDC signal pulses.

The minimal value is defined such that the ΔM(n−1) has the minimal value if the following equations (6) and (7) are satisfied at the same time:

$$\Delta M(n-1) - \Delta M(n-2) < 0 \quad (6)$$

$$\Delta M(n) - \Delta M(n-1) > 0 \quad (7)$$

Figure 9:
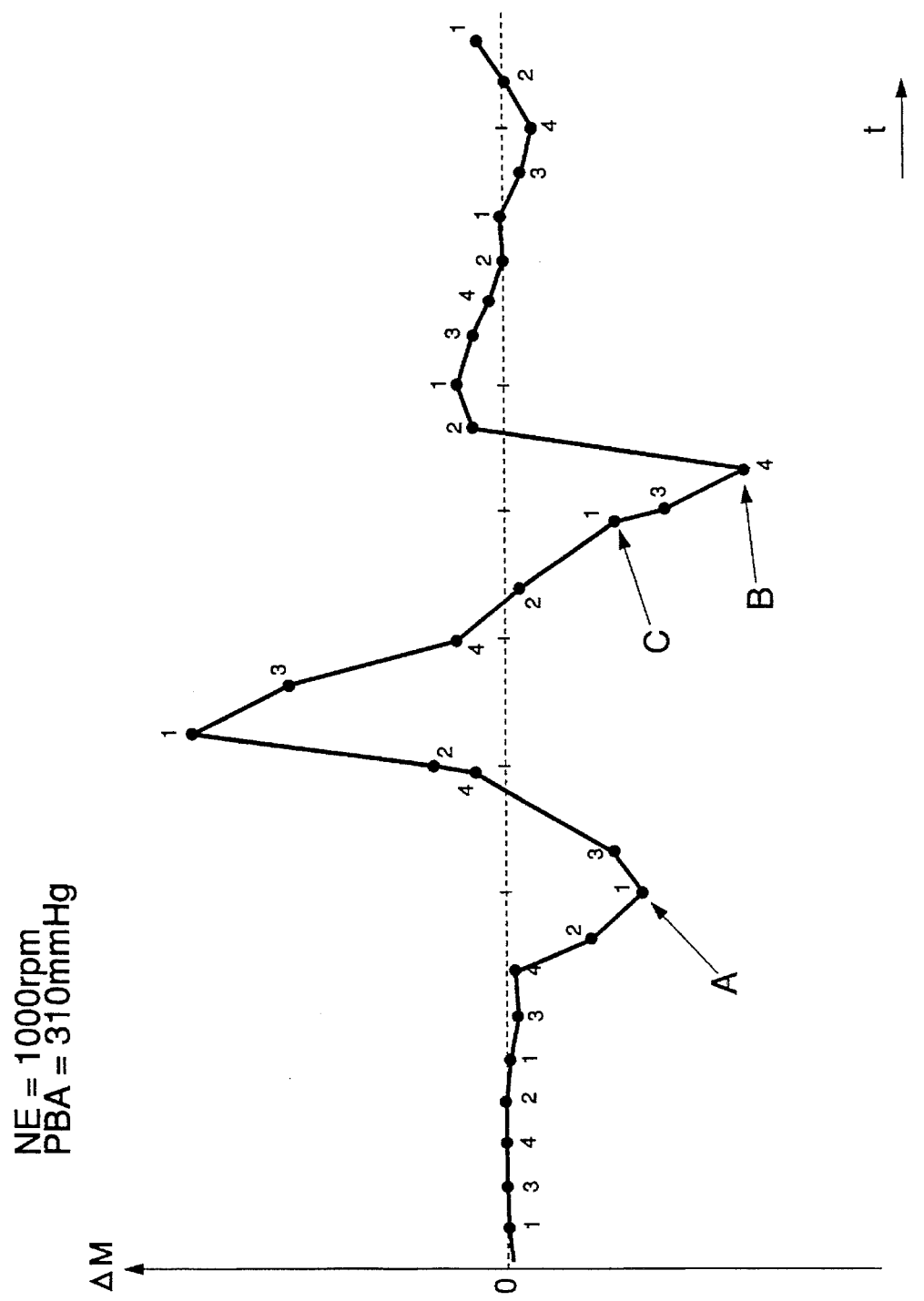
FIG. 9 is a diagram showing the parameter ΔM representative of a rate of variation in the engine rotational speed with the lapse of time, in the event of occurrence of a misfire.

FIG. 9 shows, by way of example, a change in the ΔM value with the lapse of time in the case where a sporadic misfire has occurred in the #1 cylinder. In the figure, ΔM values corresponding to points A and B have minimal values at which the direction of change in the ΔM value is inverted (ΔM value sign-changing point). Numerals along the ΔM curve in FIG. 9 represent cylinder numbers, and the interval between adjacent numerals corresponds to 1 TDC (one ignition cycle). In the present embodiment, the ΔM value represents a degree of deceleration of the engine rotational speed NE. Therefore, when the ΔM value decreases toward a minimal value, it means that the engine rotational speed deceleration has decreased, whereas after the ΔM value reached a minimal value, it means that the engine rotational speed deceleration has increased.

If the answer to the question at the step S34 is negative (NO), the program is immediately terminated, whereas if it is affirmative (YES), i.e. if there has been a ΔM value assuming a minimal value over the past four-TDC period, it is determined at a step S35 whether or not a cylinder corresponding to the minimal value (#1 cylinder indicated by the point A and #4 cylinder by the point B in the FIG. 9 example) was also determined to be a cylinder corresponding to the minimal value 1 TDC before the present loop, i.e. in the last loop of execution of the present program. If the answer to this question is affirmative (YES), the program is immediately terminated. This is to avoid repeated determination of the same cylinder having a minimal value, because upon occurrence of a misfire the same cylinder is liable to be determined as a cylinder corresponding to a minimal value twice or more. On the other hand, if the answer to the question at the step S35 is negative (NO), the program proceeds to a step S36, wherein it is determined whether or not the sporadic misfire-determining flag FMSTAN is set to "1". If the answer to the question at the step S33 is affirmative (YES) in the first loop of execution of the program after the monitoring conditions are determined to be satisfied at the step S31, the answer to the question at the step S36 becomes negative (NO) since the sporadic misfire-determining flag FMSTAN has been set to "0" at the step S32, and then it is positively determined that the engine is in a continuous misfiring state, and therefore the program proceeds to a step S39. On the other hand, if the answer to the question at the step S33 is negative (NO), that is, for example, if the difference cumulative value MS once exceeds the misfire-determining threshold value MSLMT and thereafter falls below the same, it is determined whether or not the flag FMS is set to "1", at a step S43 If it is not set to "1" the program is immediately terminated, whereas if it is set to "1", a misfire kind-determining variable nFMS is decremented by "1" at a step S44, and the sporadic misfire-determining flag FMSTAN is set to "1" at a step S37, followed by terminating the program. If the difference cumulative value MS exceeds the misfire-determining threshold value MSLMT in a subsequent loop, the answer to the question at the step S33 becomes affirmative (YES). Then, after the steps S42, S34 and S35 are executed, the answer to the question at the step S36 is affirmative (YES). Then, the program proceeds to a step S38, wherein it is determined whether or not the engine speed variation rate ΔM assumes a minimal value in the present loop, and if ΔM assumes a minimal value, this minimal value in the present loop is smaller than the last minimal value. If the answer to the question is negative (NO), the program is terminated, thereby avoiding erroneous detection as to occurrence of a misfire, caused by reactionary vibrations following a sporadic misfire.

On the other hand, if the answer to the question at the step S38 is affirmative (YES), the program proceeds to the step S39.

At the step S39, it is determined that a misfire has occurred in a second preceding cylinder before the cylinder corresponding to the minimal value (#1 cylinder indicated by the point C in the FIG. 9 example). That is, a cylinder corresponding to a minimal value of ΔM comes behind a cylinder which has misfired, by two cylinders. Then, first and second misfiring occurrence numbers nMFA and nMFBC, hereinafter referred to, are both incremented by "1" and a flag FMFCTYLn, which indicates that a misfiring cylinder has been finally determined, is set to "1" at a step S40, followed by the program proceeding to steps S45 et seq.

At the step S45, the misfire kind-determining variable nMFS is incremented by "1" and then at a step S46, it is determined whether or not the variable nMFS exceeds a predetermined value nMFSA (e.g. 100). If nMFS>nMFSA holds, it is finally determined at a step S47 that misfires have consecutively occurred (continuous misfiring), whereas if nMFS≦nMFSA holds, it is finally determined at a step S48 that a sporadic misfire has occurred, followed by terminating the program.

As described above, according to the present embodiment, by comparing minimal values of ΔM with each other, it is possible to detect a plurality of kinds of misfires, irrespective of the pattern in which the minimal values occur and without erroneous detection of misfires caused by reactionary vibrations, thus enabling achievement of high versatility and high misfire detection accuracy. Besides, it is possible to discriminate between a sporadic misfire and continuous misfires and select respective different misfire detecting manners depending on the discrimination, to thereby enable detection of misfires with accuracy, irrespective of the kinds of misfires.

Although in the above described embodiment, minimal values of ΔM are compared with each other, alternatively maximal values of ΔM may be compared with each other.

Figure 10:
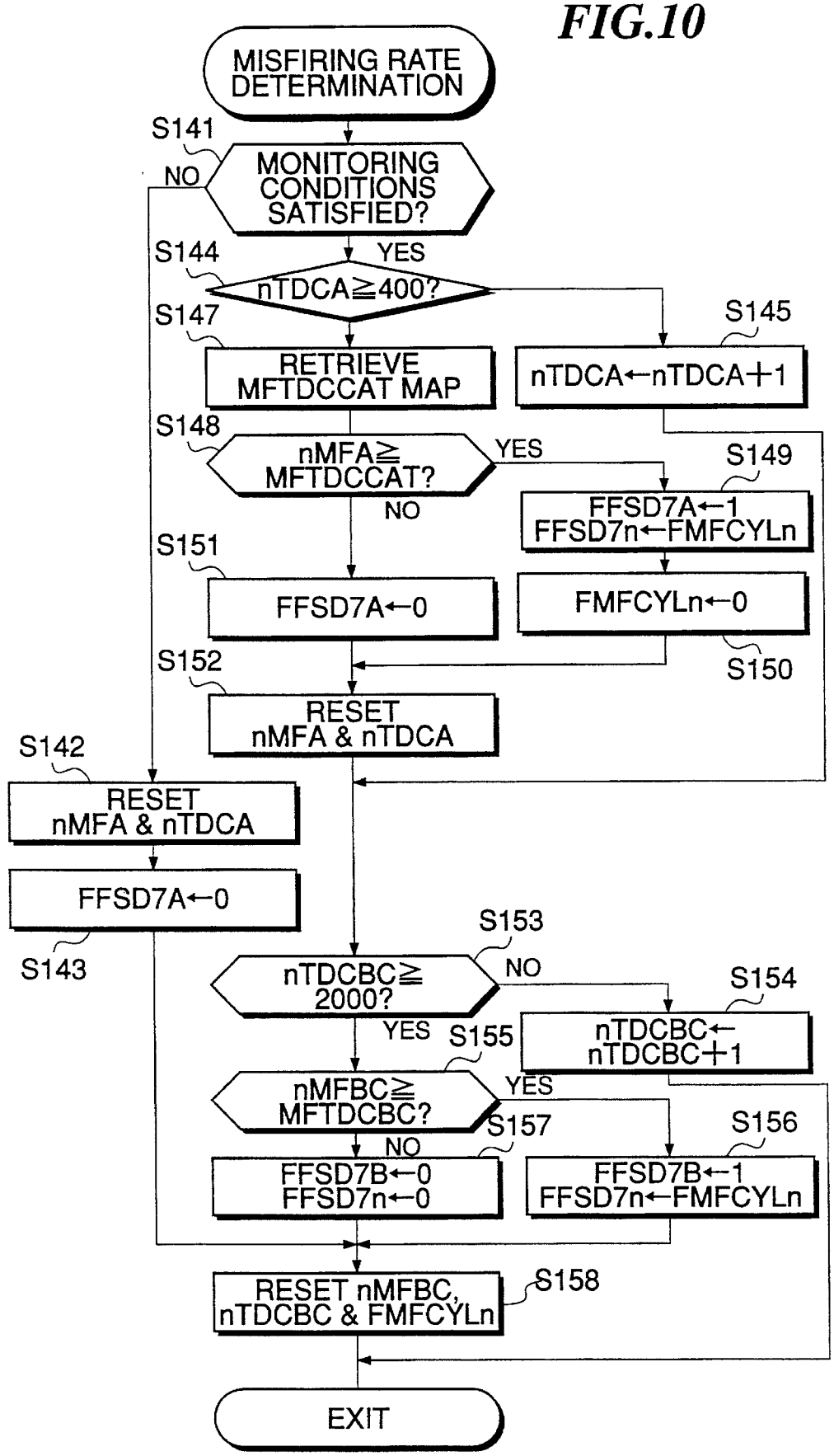
FIG. 10 is a flowchart showing a subroutine for determining combustion states of the engine, based on a misfiring state of the engine.

Fig.10 shows a subroutine for determining combustion states of the engine, based on the state of misfire occurrence, which is executed at the step S5 in FIG. 2.

First, at a step S141, similarly to the step S31 in FIG. 7, it is determined whether or not the aforesaid monitoring conditions are satisfied. If the monitoring conditions are not satisfied, parameters to be used in the present program are initialized at steps S142, S143 and S158, followed by terminating the routine.

If the monitoring conditions are satisfied, it is determined at a step S144 whether or not a count value of a first TDC counter nTDCA is equal to or more than 400. If the count value thereof is smaller than 400, it is incremented by "1" at a step S145, and then the program proceeds to a step S153.

If the count value of the counter nTDCA becomes equal to or more than 400, the program proceeds to a step S147, wherein an MFTDCCAT map is retrieved in accordance with the engine rotational speed NE and the intake pipe absolute pressure PBA to calculate a first reference value MFTDCCAT used for determination of the engine combustion state. The MFTDCCAT map is set based on the engine rotational speed NE and the intake pipe absolute pressure PBA.

Then, at a step S148, it is determined whether or not the first misfire occurrence number nMFA, which is incremented by "1" when a misfire has been detected at the step S40 in FIG. 7 and indicates the number of times of misfire occurrence every 400 firing cycles, is equal to or larger than the first reference value MFTDCCAT, at a step S148.

If nMFA≧MFTDCCAT holds, it is determined that the engine is in a combustion state which adversely affects exhaust system component parts such as a three-way catalyst arranged in the exhaust system of the engine (a misfiring state), and then a first abnormality flag FFSD7A which indicates occurrence of the above combustion state is set to "1" and a flag FFSD7n which indicates detection of a misfire in each of the cylinders, is updated to a flag FMFCYLn indicating a misfiring cylinder, at a step S149. Further, the flag FMFCYLn is set to "0" at a step S150, and the first misfire occurrence number nMFA and the counter nTDCA are both reset to "0" at a step S152, followed by the program proceeding to the step S153. On the other hand, if nMFA<MFTDCCAT holds at the step S148, the first abnormality flag FFSD7A is set to "0" at a step S151, and then the program proceeds to the step S152.

At the step S153, it is determined whether or not a count value of a second TDC counter nTDCBC occurrence every 2000 firing cycles is equal to or more than 2000. If the count value is less than 2000, it is incremented by "1" at a step S154, followed by terminating the present routine.

If the count value of the counter nTDCBC is equal to or more than 2000, the program proceeds to a step S155, wherein it is determined whether or not the second misfire occurrence number nMFBC, which is incremented by "1" when a misfire has been detected at the step S40 in FIG. 7 and indicates the number of times of occurrence of misfires every 2000 ignition cycles, is equal to or more than a second reference value MFTDCBC.

If nMFBC≧MFTDCBC holds, it is determined that the engine is in a combustion state which causes degradation of exhaust emission characteristics of the engine (a misfiring state), and then a second abnormality flag FFSD7B which indicates occurrence of the above degraded combustion state is set to "1" and the flag FFSD7n which indicates detection of a misfire in each of the cylinders is updated to the flag FMFCYLn indicating a misfiring cylinder, at a step S156. Further, at a step S158, the misfire occurrence number nMFBC and the counter nTDCBC are both reset to "0" and the flag FMFCYLn is set to "0", followed by terminating the present routine.

On the other hand, if nMFBC<MFTDCBC holds, the second abnormality flag FFSD7B and the misfire-detecting flag FFSD7n are both set to "0" (step S156), and then the program proceeds to the step S158.

As described above, according to the program of FIG. 10, combustion states of the engine are detected, which adversely affect exhaust system component parts or cause degradation of exhaust emission characteristics of the engine.

What is claimed is:

1. A combustion state-detecting system for an internal combustion engine having at least one spark plug, and a crankshaft, comprising:

crank angle signal-generating means for generating a crank angle signal with a predetermined period shorter than a firing period of said engine whenever said crankshaft rotates through a predetermined angle;

engine rotational speed-detecting means for detecting a rotational speed of said engine, based on said crank angle signal whenever said crank angle signal is generated, and for generating a rotational speed signal indicative of the rotational speed detected by said engine rotational speed-detecting means;

extraction means for extracting from said rotational speed signal a specific frequency component therefrom;

variation rate-determining means for determining a rate of variation in said specific frequency component extracted by said extraction means every first predetermined time period;

average value-determining means for determining an average value of said rate of variation every second predetermined time period which is longer than said first predetermined time period;

difference cumulative value-determining means for determining a difference between said average value and said rate of variation, and for cumulating absolute values of said difference over said second predetermined time period to obtain a difference cumulative value; and combustion state-determining means for comparing said difference cumulative value with a predetermined value, and for determining that said engine is in a degraded combustion state when said difference cumulative value exceeds said predetermined value;

wherein said combustion state-determining means includes combustion state kind-determining means for determining that said engine is in a continuous degraded combustion state when said difference cumulative value has continued to exceed said predetermined value, and for determining that said engine is in a sporadic degraded combustion state when said difference cumulative value once exceeds said predetermined value and then becomes smaller than said predetermined value, before said difference cumulative value again exceeds said predetermined value.

2. A combustion state-detecting system as claimed in claim 1, wherein said combustion state-determining means includes sign change-determining means for determining a change in sign of a value of said rate of variation by determining whether there has been a sign changing point at which a direction of change in said rate of variation is inverted from a direction in which said rate of variation decreases to a direction in which said rate of variation increases or vice versa, over said second predetermined time period before a time point said difference cumulative value is determined to exceed said predetermined value, said combustion state kind-determining means determining that said engine has undergone a sporadic misfire when a value of said rate of change at a present one of said sign changing point is smaller than a value of said rate of change at an immediately preceding one of said sign changing point.

3. A combustion state-detecting system as claimed in claim 1 or 2, wherein said second predetermined time period corresponds to one combustion cycle of said engine.

* * * * *